(12) United States Patent
Li

(10) Patent No.: US 7,194,785 B2
(45) Date of Patent: *Mar. 27, 2007

(54) BUFFER BAR FASTENING STRUCTURE

(75) Inventor: Chih-Hung Li, Taipei (TW)

(73) Assignee: Lushridge Incorporated, Taipei (TW)

( * ) Notice: Subject to any disclaimer, the term of this patent is extended or adjusted under 35 U.S.C. 154(b) by 304 days.

This patent is subject to a terminal disclaimer.

(21) Appl. No.: 10/882,246

(22) Filed: Jul. 2, 2004

(65) Prior Publication Data

US 2005/0204651 A1   Sep. 22, 2005

(30) Foreign Application Priority Data

Feb. 24, 2004   (TW) ............................... 93104605 A

(51) Int. Cl.
*E05F 5/06* (2006.01)
*E05F 1/08* (2006.01)

(52) U.S. Cl. .................. 16/85; 16/54; 16/286; 16/375

(58) Field of Classification Search ............... 16/85, 16/86 R, 86 A, 374, 375, 284, 286 X–288, 16/366, 54, 50; 296/76; 52/110; 49/386
See application file for complete search history.

(56) References Cited

U.S. PATENT DOCUMENTS

| | | | |
|---|---|---|---|
| 3,376,088 A | * | 4/1968 | Bol et al. .................... 292/353 |
| 4,110,868 A | * | 9/1978 | Imazaike ........................ 16/84 |
| 5,845,749 A | * | 12/1998 | Moretz et al. ............... 188/281 |
| 6,408,483 B1 | * | 6/2002 | Salice ............................ 16/85 |
| 6,553,617 B1 | | 4/2003 | Salice |
| 6,591,454 B2 | | 7/2003 | Brustle |
| 6,615,450 B2 | | 9/2003 | Salice |
| 6,666,306 B2 | | 12/2003 | Gasser |
| 2004/0231099 A1 | * | 11/2004 | Li ................................. 16/85 |

FOREIGN PATENT DOCUMENTS

DE      3729597 A1 *  3/1989
JP    2005249208 A  *  9/2005

* cited by examiner

*Primary Examiner*—Chuck Y. Mah
(74) *Attorney, Agent, or Firm*—Rabin & Berdo, P.C.

(57) ABSTRACT

A buffer bar fastening structure for fastening a buffer bar to a hinge of a cabinet door includes a barrel which has flanges on two ends to couple with arched portions at two ends of a latch member to couple the buffer bar on the barrel in a turnable manner. The latch member has one side connecting to a fastening member, which may be coupled with an adjusting slot of the hinge and a fastening section on another side to fasten the buffer bar to the hinge. The structure is simple and easy to install.

14 Claims, 9 Drawing Sheets

BUFFER BAR FASTENING STRUCTURE

FIELD OF THE INVENTION

The present invention relates to a buffer bar fastening structure for fastening a buffer bar to a hinge of a cabinet door. The invention has a simple structure and is easy to install.

BACKGROUND OF THE INVENTION

A buffer bar generally is used to control the speed of door opening/closing and a moving mechanism. The most common application is the door check for automatically and slowly closing the door after being opened, without generating a big noise or damaging the door or doorframe. It also may be adopted on other movable mechanisms to provide a returning force and a resistant force against the movement to achieve a damping effect. In general, the buffer resistant force generated by the buffer bar has two types of sources: a pneumatic type and an oil pressure type, or the so-called air pressure bar or oil pressure bar.

The conventional buffer bar has a big drawback, i.e. oil leakage or air leakage. This problem could cause dysfunction of the buffer bar. When used on cabinet windows or doors, in addition to the aforesaid problem, the factors of outside appealing and ornamental effects also have to be considered. The huge noise of the pneumatic bar and oil leakage of the oil pressure bar are not acceptable. While the huge noise of the pneumatic bar makes the cabinet not appealing, oil leakage of the oil pressure bar tends to smear the cabinet and articles held in the cabinet.

Hence the cabinet generally is not equipped with a buffer bar. As a result, a big noise is generated when the cabinet door is closed, and the cabinet door or cabinet is easily damaged. Many users then want to install the buffer bar after having purchased a cabinet. However, installation of the buffer bar is not easy; to commission outside help for installation incurs an additional expense.

SUMMARY OF THE INVENTION

In view of the aforesaid problems, the present invention aims to provide a buffer bar fastening structure that has a simple structure and is easy to install.

The buffer bar fastening structure according to the invention includes a holding member and a fastening member. The holding member holds a buffer bar. The fastening member has one side connecting to the holding member and another side extended downwards to form a fastening section. The fastening member has a hook to couple with a hinge and the fastening section may be fastened to one side of the hinge, to install the buffer bar on the hinge easily.

In another aspect, the buffer bar according to the invention includes a barrel and a latch member to fasten the buffer bar. The barrel houses the buffer bar and has axial flanges on two ends. The latch member has a length substantially the same as the barrel and has two ends extended transversely to form an arched portion. The arched portion has a notch to couple with an axle of the buffer bar and enter the flange, and then may be turned to abut onto the flange, to form a secure latch without separating from the barrel, for holding the buffer bar securely.

In addition, the latch section may be coupled with the fastening member to facilitate replacement of the buffer bar, and make installation of the buffer bar on the hinge easier, so that users can do installation tasks themselves easily.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
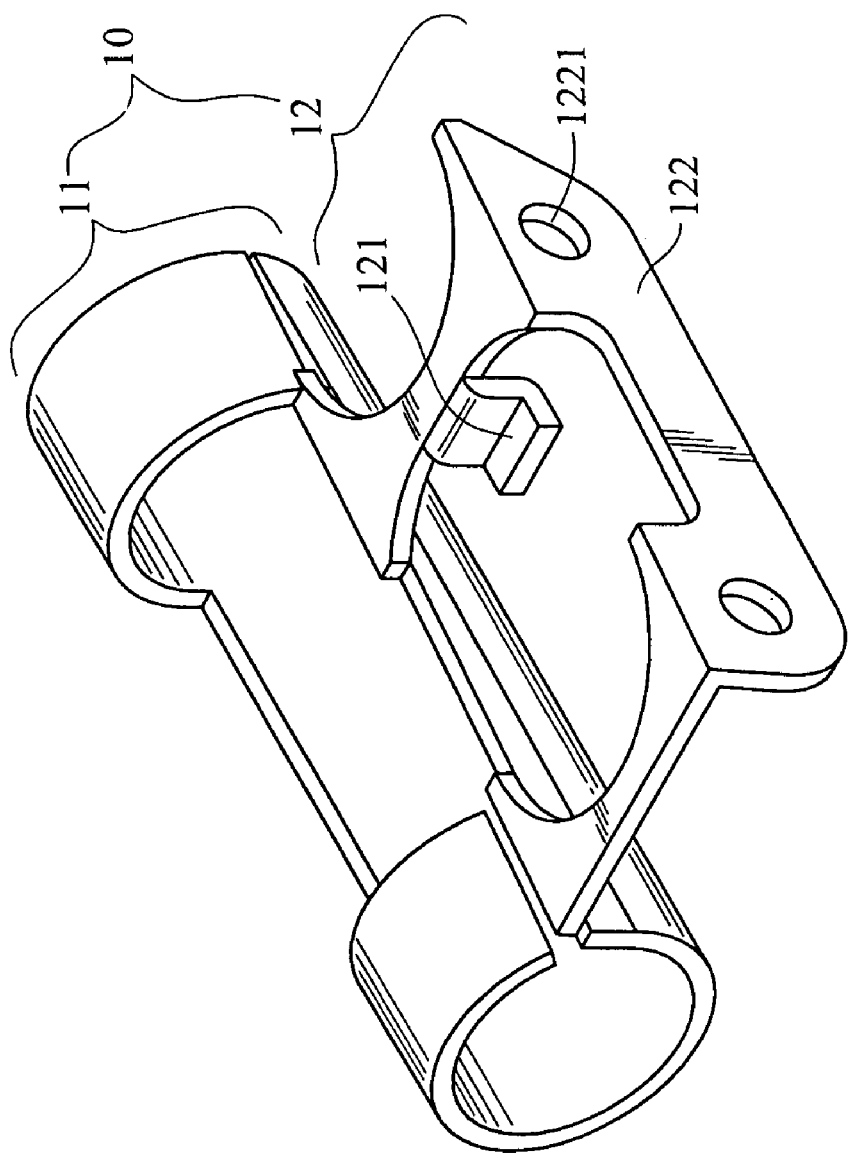
FIG. 1 is a schematic view of the invention.
Figure 2A:
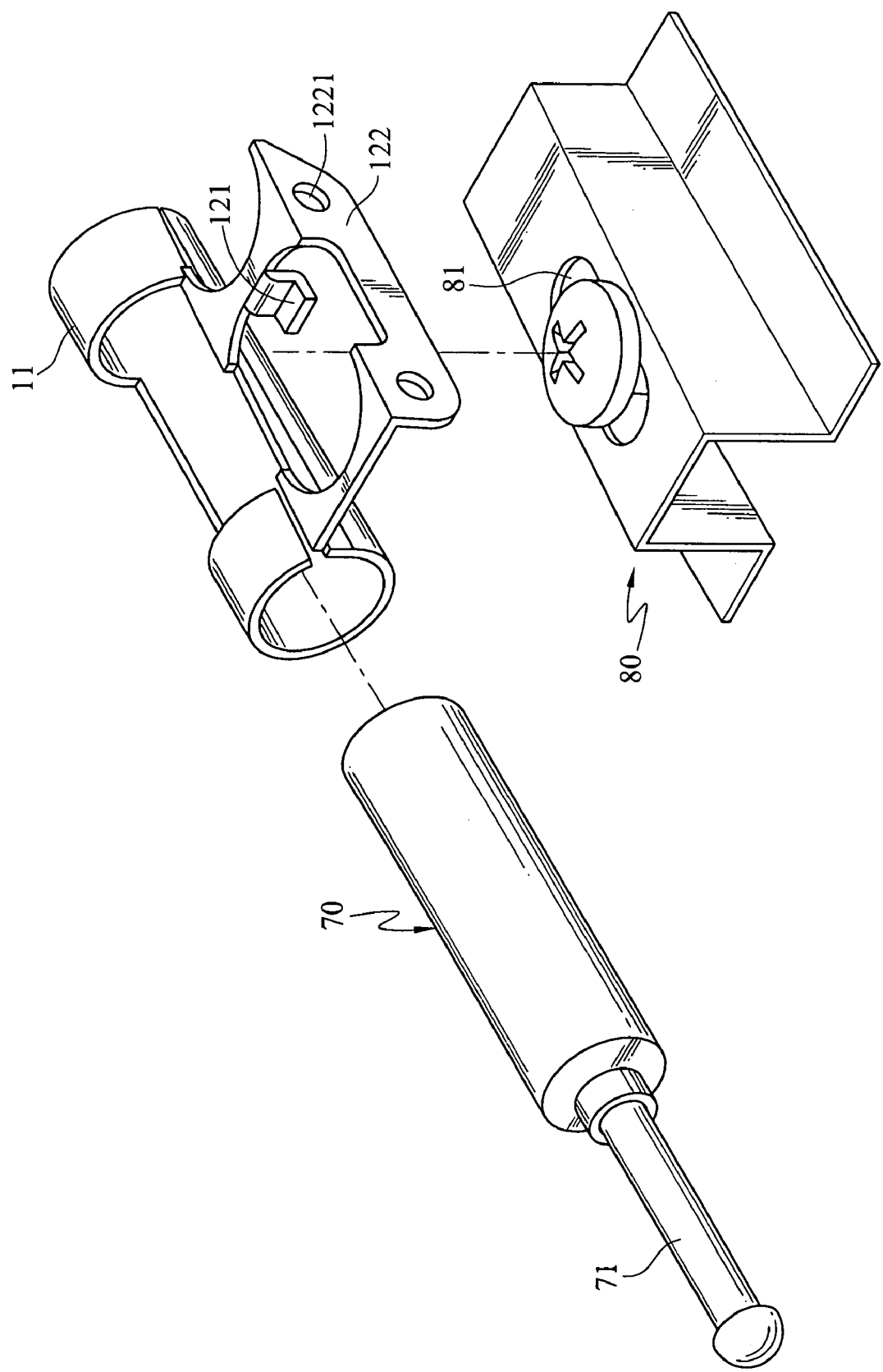
FIGS. 2A and 2B are schematic views of the invention with the buffer bar coupling on a hinge.
Figure 2B:
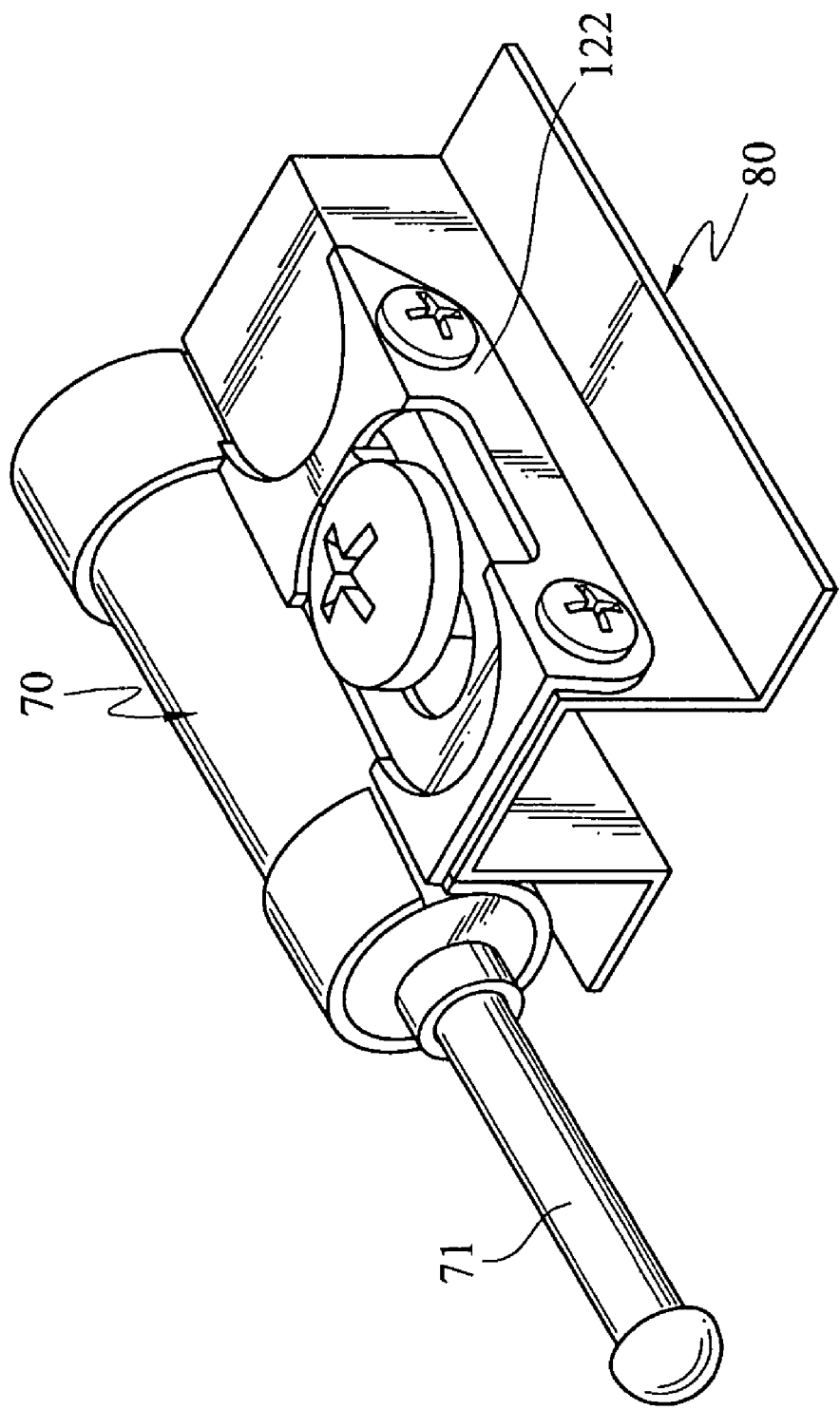

Referring to FIG. 1, the buffer bar fastening structure 10 according to the invention includes a holding member 11 and a fastening member 12. The holding member 11 is for holding a buffer bar 70 (referring to FIG. 2B), hence its shape may be altered according to the profile of the buffer bar 70. The fastening member 12 has a hook 121 directing downwards, one side connecting to the holding member 11 and another side extended downwards to form a fastening section 122. The fastening section 122 has one or more fastening bores 1221. Referring to FIG. 2A, the buffer bar 70 is held by the holding member 11, and the fastening member 12 has a length substantially the same as the width of a hinge 80, for holding the buffer bar tentatively. The hook 121 may be coupled in an adjusting slot 81 or the hinge 80. The fastening section 122 has fastening holes 1221 to receive screws (not shown in the drawings) for fastening, as shown in FIG. 2B. The adjusting slot 81 is a conventional feature of the hinge 80 to adjust the elevation variation of the cabinet door. The invention provides a novel design to take the advantage of the existing adjusting slot 81 for fastening. It is noted that the hinge 80 is illustrated in the drawings only schematically for the sake of convenient illustration, and features that would be present in practice to permit pivoting movement are not shown.

Figure 3A:
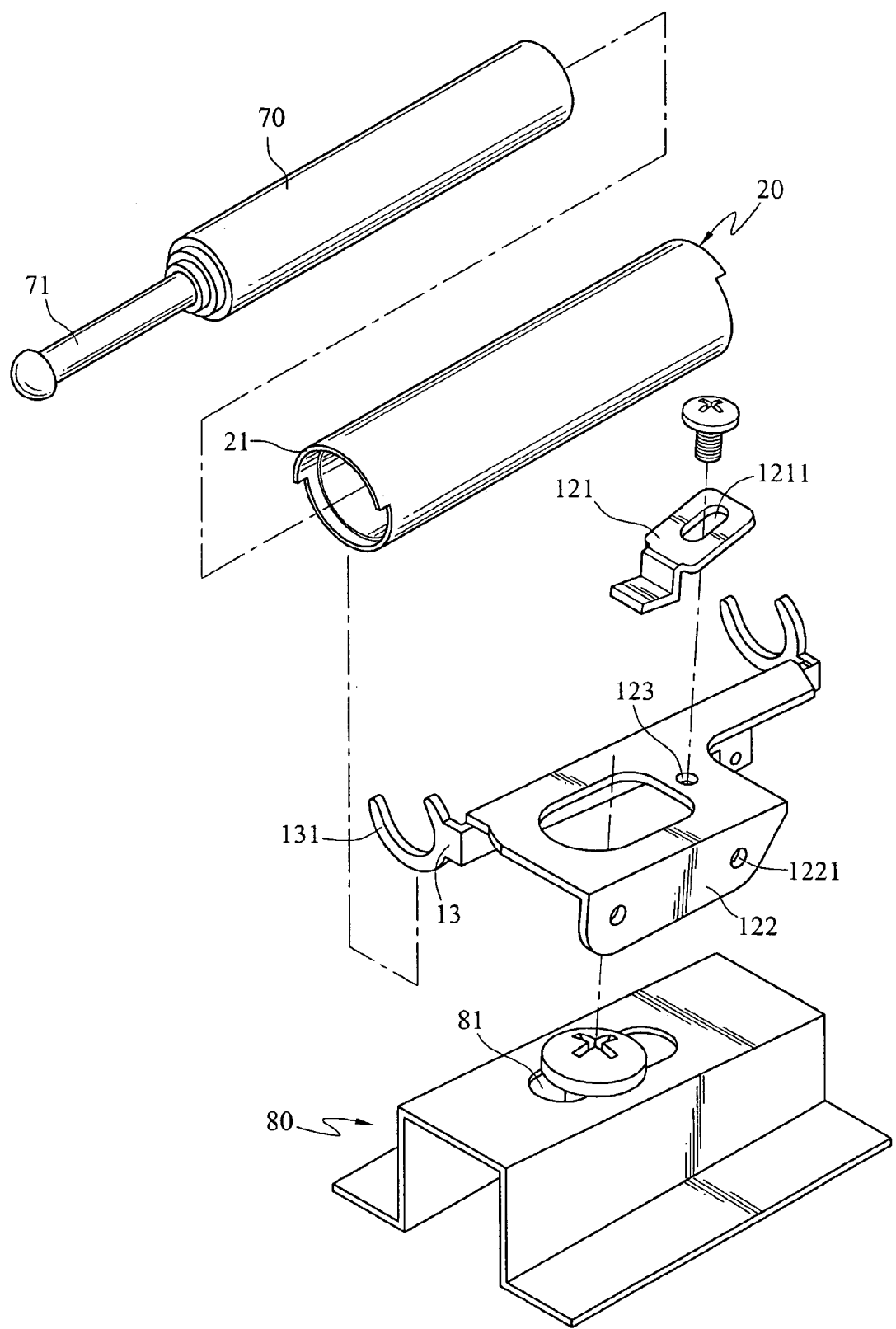
FIGS. 3A and 3B are schematic views of another embodiment of the invention.
Figure 3B:
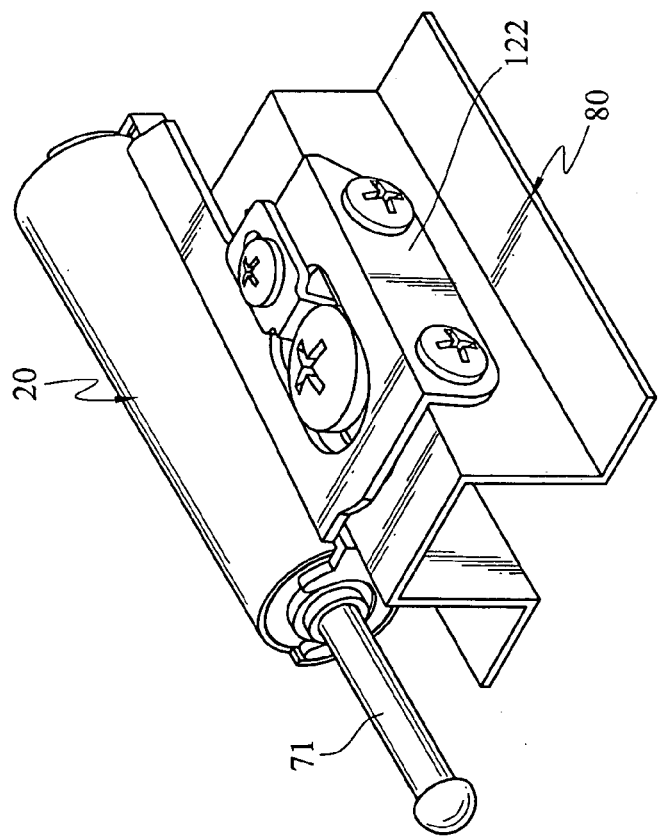

The holding member 11 provided in the previous embodiment may also be replaced by a barrel 20 and a latch member 13 in another embodiment (referring to FIGS. 3A and 3B). The barrel 20 is substantially a cylindrical element and has a housing space inside to hold the buffer bar 70. The buffer bar 70 has an axle 71 exposed outside to be in contact with a cabinet door (not shown in the drawings), to provide a damping function. The barrel 20 has two ends extended axially to form respectively a flange 21 along the peripheral wall. The flanges 21 at two ends of the barrel correspond to each other, and do not encompass the entire perimeter.

The fastening member 12 has latch members 13 on one side opposite to the fastening section 122 (the side where the previous holding member 11 is located, referring to FIG. 1). The latch members 13 are located at a distance substantially the same as the length of the barrel 20. Each latch member 13 has two ends extended transversely, to form an arched portion 131. The arched portion 131 has a notch. The two arched portions 131 also correspond to each other.

Figure 4A:
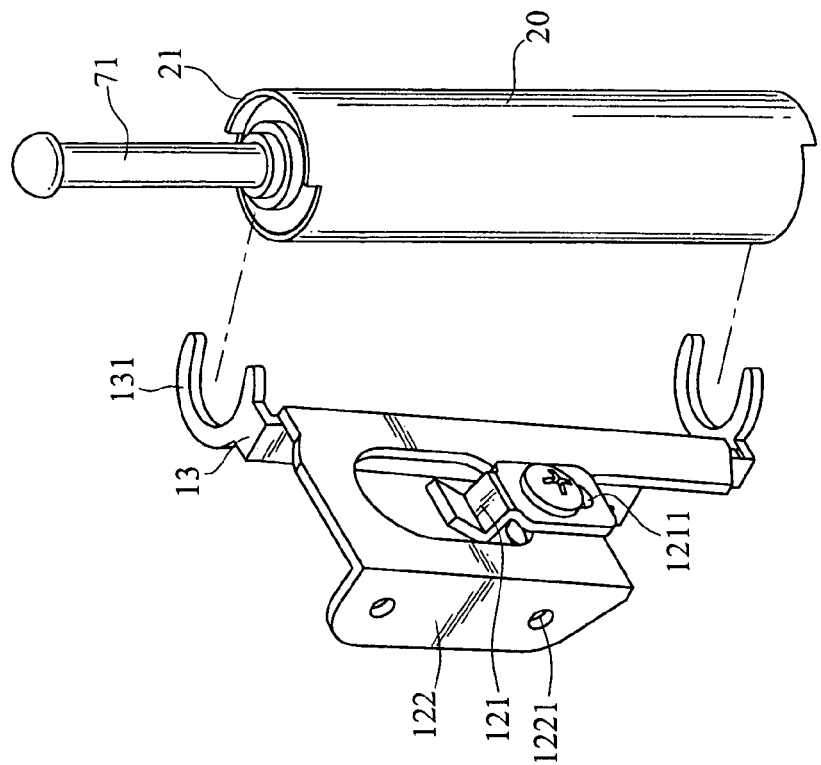
FIGS. 4A, 4B and 4C are schematic views of the invention shown in FIG. 3 in operating condition.
Figure 4C:
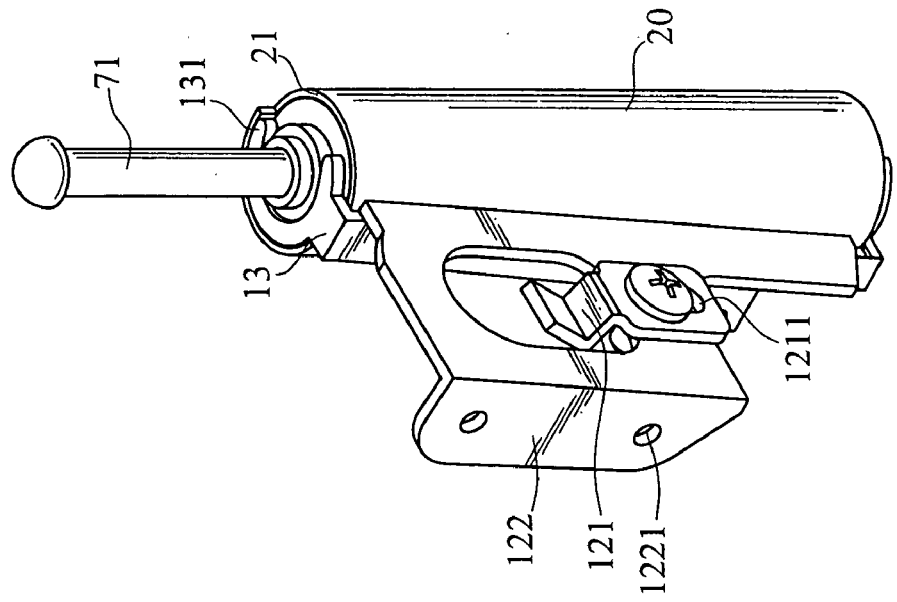
Figure 4B:
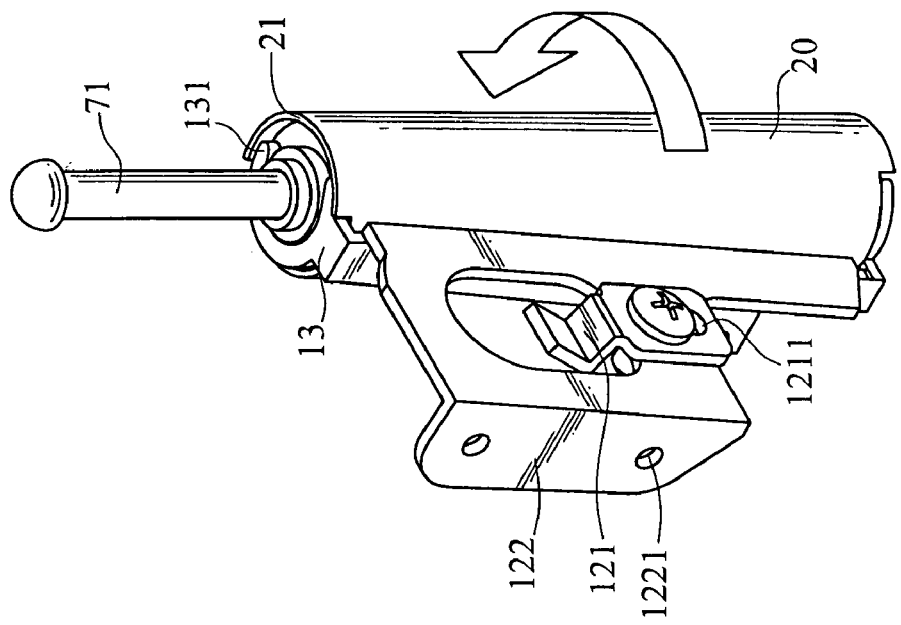

For installation, insert the buffer bar 70 into the barrel 20; couple the arched portion 131 of the latch member 13 on two ends of the barrel 20 (referring to FIG. 4A) for tentative anchoring, to restrict the upward and downward movement of the buffer bar 70; couple the notch of the arched portion 131 with the axle 71 of the buffer bar 70, and turn the latch member 13 with the fastening member 12 relative to the barrel 20 (referring to FIG. 4B) and move the arched portion 131 adjacent to the side wall of the flange 21 (referring to FIG. 4C), so that the latch member 13 is prevented from moving laterally (transversely) and the buffer bar 70 is confined and anchored. Release of the confinement can only be accomplished by turning. The arched portion 131 is substantially a section of a circle with an inner diameter greater than the outer diameter of the axle 71 and equals to the collar 721, and an outer diameter substantially the same as the inner diameter of the flange 21, to achieve secured coupling. The other end of the buffer bar 70 also adopts the same design. Details are omitted. To facilitate coupling and turning of the arched portion 131, the arched portion 131 and the flange 21 are formed at an angle slightly smaller than 180 degrees, i.e. less than half the perimeter.

Figure 7:
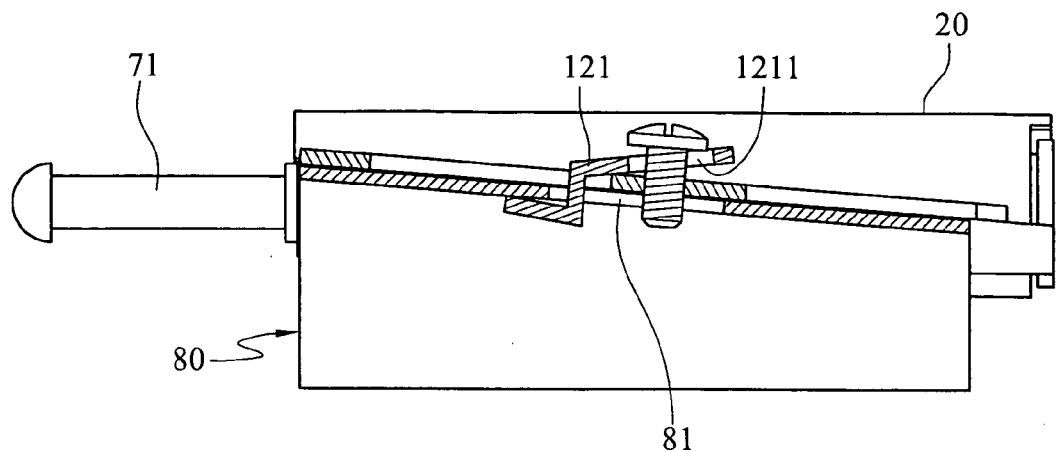
FIG. 7 is a schematic view of a coupling condition of the hook of the invention.
Figure 8:
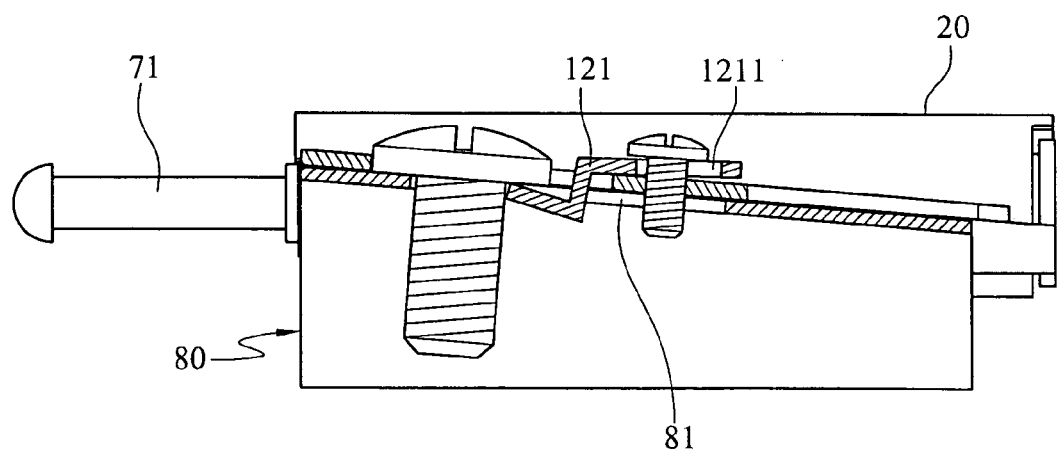
FIG. 8 is a schematic view of another coupling condition of the hook of the invention.

Then the fastening member 12 may be fastened to the hinge 80. There might be a need to adjust the elevation of the hinge 80. The location and length of adjusting slot 81 may vary, the hook 121, formed in a fixed manner, could cause location alteration of the entire fastening structure 10, and the damping function of the buffer bar 70 might be affected. To address this concern, the hook 121 may be designed movable (referring to FIG. 3A). The hook 121 has a slot 1211, which may be coupled with a screw for anchoring on the fastening member 12, to adjust the relative position of the two. Namely, the relative position may be adjusted according to the adjusting slot 81 of the hinge 80, to set the location of the buffer bar 70. The hook 121 may be directly latched on the hinge 80 (referring to FIG. 7), or be latched on the edge of the screw of the hinge 80 (referring to FIG. 8) depending on coupling convenience. Similarly, this approach may also be adapted to the embodiment shown in FIG. 1.

Figure 5:
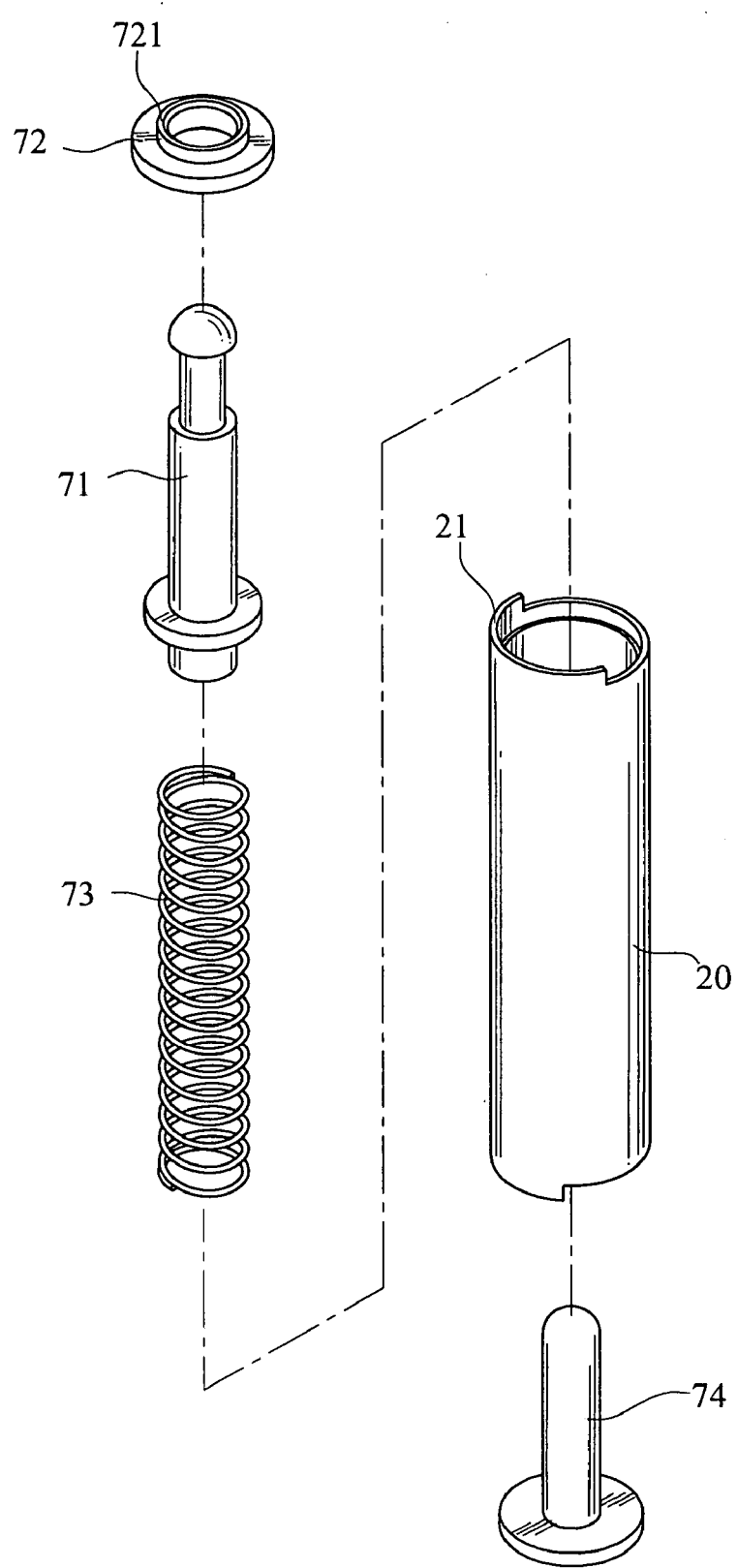
FIG. 5 is a schematic view of a variation of the invention shown in FIG. 3.

While housing the buffer bar 70 in the barrel 20 is convenient, additional costs incur. To overcome this concern, the barrel 20 may directly serve as the shell of the buffer bar 70. Referring to FIG. 5, the buffer bar includes an axle 71, an upper cap 72, a spring 73, and a lower cap 74. The upper cap 72 and the lower cap 74 are used to confine the spring 73 and the axle 71 in the barrel 20. The upper cap 72 has a collar 721 to be coupled with the latch member 13 for confining in the barrel 20 thereby, to omit the outer shell of the buffer bar 70. The example set form above is only one of the embodiments. All other buffer bars, either an oil pressure type or a pneumatic type, also can adopt the invention described previously.

Figure 6:
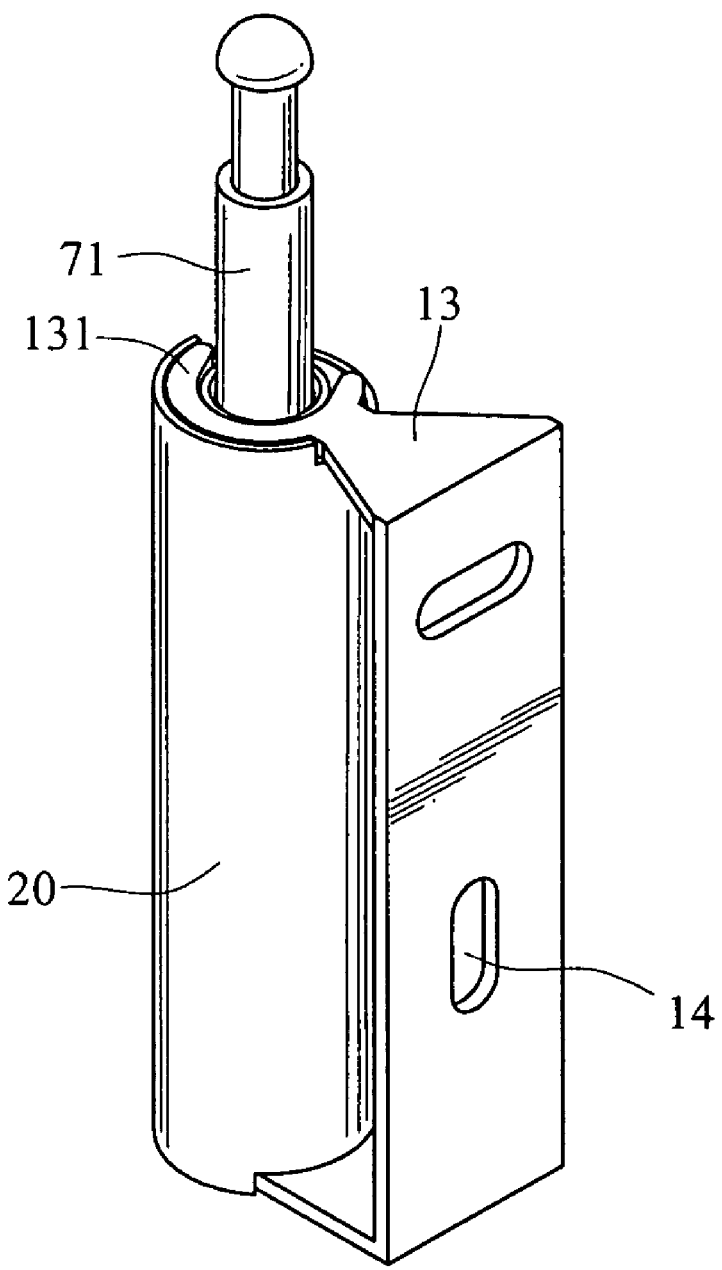
FIG. 6 is a schematic view of another embodiment of the invention.

In addition, coupling of the latch member 13 and the barrel 20 may also adopt an approach shown in FIG. 6. It may be adapted for housing and fastening the buffer bars of all types. The latch member 13 has a plurality of slots 14 to allow users to install by themselves.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A buffer bar fastening structure for fastening a buffer bar having an axle, comprising:
    a barrel for housing the buffer bar, the barrel having two ends, each end having an axial flange; and
    a member, having two arched portions that extend transversely from the member at positions that are spaced apart by a distance that is substantially the same as the length of the barrel, each arched portion being generally C-shaped and having a recess larger in size than the diameter of the axle of the buffer bar to couple to the buffer bar to hold the two ends of the barrel, the barrel being rotatable to a position such that the flanges thereof lie adjacent the arched portions to prevent the barrel from escaping the member.

2. The buffer bar fastening structure of claim 1, wherein each flange extendes less than one half of the perimeter of the barrel.

3. The buffer bar fastening structure of claim 1, wherein the arched portions have substantially the same shape.

4. The buffer bar fastening structure of claim 3, wherein each arched portion has another outer edge with a curvature substantially the same as the inner curvature of the flange.

5. The buffer bar fastening structure of claim 3, wherein each arched portion extends through less than 180 degrees of a sector.

6. The buffer bar fastening structure of claim 1, wherein the member is extended to form a fastening member for fastening to a hinge.

7. The buffer bar fastening structure of claim 6, wherein the fastening member has a length substantially the same as the width of the hinge, one side connecting to the arched portions and another side extended downwards to form a fastening section for fastening to a lateral side of the hinge, the fastening member having a hook to couple with the hinge for fastening.

8. The buffer bar fastening structure of claim 7, wherein the hook is movably coupled on the fastening member.

9. The buffer bar fastening structure of claim 1, wherein the buffer bar additionally has a cylindrical portion from which the axle extends and wherein the cylindrical portion of the buffer bar is inserted into the barrel.

10. The buffer bar fastening structure of claim 1, wherein the recess in each arched portion is smaller in size than the barrel.

11. A buffer bar fastening structure for fastening a buffer bar to a hinge which is movably connected to a cabinet door and a cabinet and has an adjustment slot, comprising:
    a holding member for holding the buffer bar; and
    a fastening member having a hook, the fastening member additionally having a side that is connected to the holding member and having another side that extends downwards to form a fastening section to fasten to a lateral side of the hinge, the hook being disposed at the adjustment slot for fastening to the hinge.

12. The buffer bar fastening structure of claim 11, wherein the fastening member has a width substantially the same as the width of the hinge.

13. The buffer bar fastening structure of claim 11, wherein the hook is movably mounted onto the fastening member.

14. The buffer bar fastening structure of claim 11, wherein the buffer bar includes an axle portion and a cylindrical portion from which the axle portion extends, and wherein the cylindrical portion of the buffer bar is inserted into the holding member.

* * * * *